(No Model.)
J. G. GREENE.
BUTTONHOLE CUTTER.
No. 492,796. Patented Mar. 7, 1893.
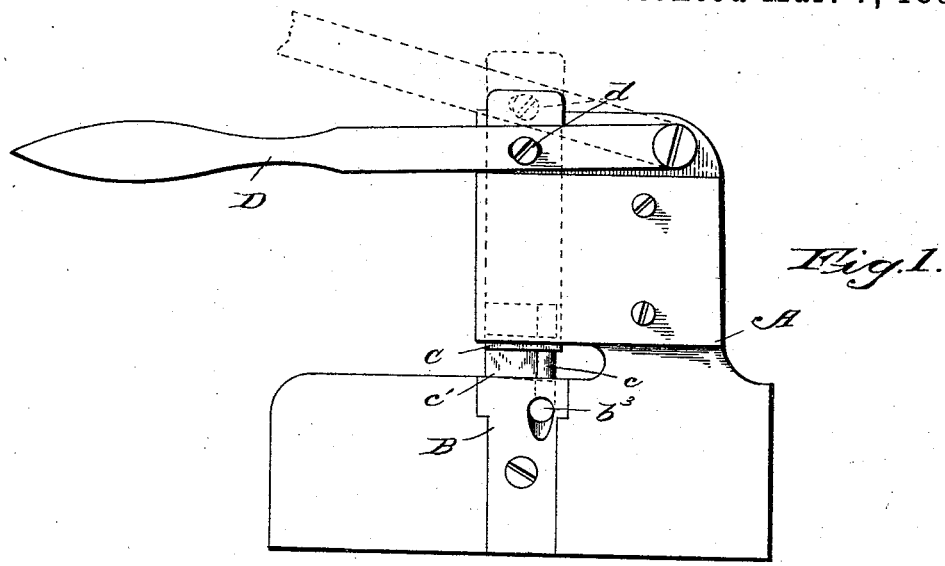
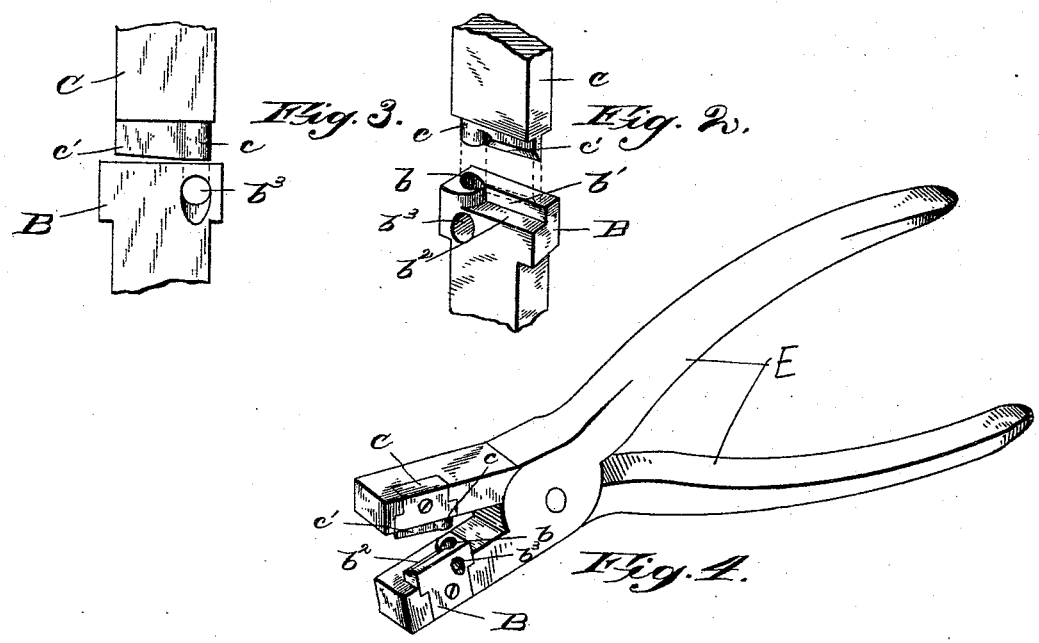
Witnesses:
Inventor:
James G. Greene
by MacLeod, Calver & Randall,
Attorneys.
THE NORRIS PETERS CO., PHOTO-LITHO., WASHINGTON, D. C.

UNITED STATES PATENT OFFICE.

JAMES G. GREENE, OF ELIZABETH, NEW JERSEY, ASSIGNOR TO THE SINGER MANUFACTURING COMPANY OF NEW JERSEY.

BUTTONHOLE-CUTTER.

SPECIFICATION forming part of Letters Patent No. 492,796, dated March 7, 1893.

Application filed October 7, 1892. Serial No. 448,134. (No model.)

*To all whom it may concern:*

Be it known that I, JAMES G. GREENE, a citizen of the United States, residing at Elizabeth, in the county of Union and State of New Jersey, have invented certain new and useful Improvements in Buttonhole-Cutters, of which the following is a specification, reference being had therein to the accompanying drawings.

In that class of button hole cutters which are adapted to cut an eyelet hole and which have heretofore been provided with a hollow punch for cutting the eyelet portion of the hole there has been more or less difficulty owing to the fact that the cutting edge of the hollow punch is liable to become dulled so that the cutter is not adapted to form a clean, smooth cut, (particularly in cloth) after the cutter has been in use for some time.

My invention has for its object to provide a button hole cutter which will avoid the difficulty above referred to, and which will make a clean, smooth cut in thick or thin material under all circumstances.

To this end my invention comprises two cutting members one of which is movable with relation to the other, one of said cutting members having a recess in the shape of an eyelet end of a button hole, and, extending forward from said recess, a ledge; and the other of said members being provided with a solid punch adapted to enter and fit closely in the eyelet recess and having formed integral therewith, forward of said punch, a knife portion which descends contiguous to said ledge so as to form, in connection therewith, a shear cutter. The member having the eyelet recess is provided with an aperture below the same so that the material punched out in cutting the eyelet holes can escape.

In the accompanying drawings, Figure 1 is a side view of a button hole cutter embodying my invention in one form. Fig. 2 is a detail perspective view of the cutting members, and Fig. 3 is a detail side view thereof slightly separated. Fig. 4 illustrates my invention as applied to a hand button hole cutter having two movable members operated like shear blades.

A denotes a frame work of metal or other suitable material in which is fixed a stationary cutting member B provided with an eyelet recess or aperture $b$ and cut away to form a vertical shoulder $b'$ and the horizontal ledge $b^2$, the sharp inside upper corner of said shoulder serving, in co-operation with the movable cutting member, as a shear blade.

C denotes the movable cutting member provided with a solid punch portion $c$ adapted to fit closely in the eyelet recess or opening $b$ in the member B and, extending forward from said solid punch portion $c$ and formed integral therewith, is a sharp cutting blade $c'$ which descends contiguous to the ledge of the lower member. The shank portion of the member C is herein shown as a slide adapted to be moved vertically in a suitable recess in the upper portion of the frame A and is operated by a lever handle D connected with the shank of said movable member by the pin or screw $d$.

In the form of my invention shown in Fig. 3 the cutting members B and C are constructed as above described, and as more clearly shown in Fig. 2, and are fixed to the outer ends of the two pivoted handles E connected together in a well known manner. The cutting member C is preferably formed at its lower end so that the punch portion $c$ is a little below the knife portion $c'$, as more clearly shown in Fig. 3. Thus in descending the eyelet portion of the button hole will be first punched out before the knife portion of the movable member or cutter has fully descended to form the slit. The lower member B of the cutter is preferably provided with a lateral opening $b^3$ which permits of the escape of the small pieces of material punched out in forming the eyelet portions of the button holes.

It will be understood that my improved button hole cutter is well adapted for use in connection with button hole sewing machines such as are provided with manually or automatically operated button hole cutters, as well as for use as a hand cutter, as herein illustrated.

Having thus described my invention, I claim and desire to secure by Letters Patent—

A button hole cutting device consisting of the combination with a suitable frame, of the block B fixed to said frame and provided with an opening or recess $b$ of the shape of the eyelet portion of the button-hole to be cut, said block being cut away foward of said opening or recess to form the vertical shoulder $b'$ the upper corner of which serves as a cutting edge, and the sliding member C vertically movable in said frame and having a solid punch portion $c$ adapted to closely fit and enter within the said opening $b$, and having also a knife cutting portion extending forward from and integral with the said punch portion $c$.

In testimony whereof I affix my signature in presence of two witnesses.

JAMES G. GREENE.

Witnesses:
HENRY CALVER,
WALTER J. PETTIT.